США 012348088B2

United States Patent
Okuda et al.

(10) Patent No.: US 12,348,088 B2
(45) Date of Patent: Jul. 1, 2025

(54) MECHATRONIC INTEGRATED UNIT

(71) Applicant: TOYOTA JIDOSHA KABUSHIKI KAISHA, Toyota (JP)

(72) Inventors: Yuya Okuda, Toyota (JP); Keisuke Yuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 18/106,060

(22) Filed: Feb. 6, 2023

(65) Prior Publication Data

US 2023/0268810 A1 Aug. 24, 2023

(30) Foreign Application Priority Data

Feb. 18, 2022 (JP) ................................. 2022-024300

(51) Int. Cl.
*H02K 11/33* (2016.01)
*B60K 1/02* (2006.01)
(Continued)

(52) U.S. Cl.
CPC ............... *H02K 11/33* (2016.01); *B60K 1/02* (2013.01); *B60K 6/26* (2013.01); *B60K 6/40* (2013.01);
(Continued)

(58) Field of Classification Search
CPC . B60K 1/02; B60K 6/40; H02K 11/30; H02K 11/33; H02K 11/0094; H02K 7/006; B60Y 2304/01; B60L 15/007
See application file for complete search history.

(56) References Cited

U.S. PATENT DOCUMENTS 6,201,365 B1 * 3/2001 Hara ...................... B60L 1/02
 903/952
2003/0106727 A1 * 6/2003 Takenaka ................ B60K 6/22
 903/951

(Continued)

FOREIGN PATENT DOCUMENTS

JP 2012-65436 A 3/2012
JP 2019-170068 A 10/2019
(Continued)

OTHER PUBLICATIONS

Translation of JP 2021151111 A (Year: 2021).*
Translation of JP 2022161294 A (Year: 2022).*
Translation of JP 2020162225 A (Year: 2020).*

*Primary Examiner* — Oluseye Iwarere
*Assistant Examiner* — Daniel K Schlak
(74) *Attorney, Agent, or Firm* — Sughrue Mion, PLLC

(57) ABSTRACT

A mechatronic integrated unit for a vehicle includes a housing including a first chamber and a second chamber located above the first chamber, a first motor disposed in the first chamber, a second motor disposed along a front-rear direction in the first chamber along with the first motor, at least part of the second motor being located above the first motor, and an electric circuit unit that is disposed in the second chamber and is electrically connected to at least one of the first motor or the second motor. A partition wall between the first chamber and the second chamber includes a bulging portion that bulges toward the second chamber from a portion other than the bulging portion and is located above the second motor. At least part of the electric circuit unit faces the bulging portion in the front-rear direction or in a right-left direction.

11 Claims, 4 Drawing Sheets

(51) Int. Cl.
    *B60K 6/26*            (2007.10)
    *B60K 6/40*            (2007.10)
    *B60K 6/405*          (2007.10)
    *B60L 15/00*          (2006.01)
    *B60L 15/08*          (2006.01)
    *H02K 11/00*         (2016.01)

(52) U.S. Cl.
    CPC ............. *B60L 15/007* (2013.01); *B60L 15/08* (2013.01); *H02K 11/0094* (2013.01); *B60K 6/405* (2013.01); *B60Y 2304/01* (2013.01); *B60Y 2306/03* (2013.01)

(56) References Cited

U.S. PATENT DOCUMENTS

| | | | | |
|---|---|---|---|---|
| 2009/0114462 | A1* | 5/2009 | Tahara | H02K 7/116 |
| | | | | 903/952 |
| 2009/0206709 | A1* | 8/2009 | Kakuda | H02K 5/15 |
| | | | | 310/68 D |
| 2009/0213564 | A1* | 8/2009 | Kakuda | B60K 6/365 |
| | | | | 361/811 |
| 2010/0175933 | A1* | 7/2010 | Yoshida | B60L 15/007 |
| | | | | 180/65.1 |
| 2013/0301220 | A1* | 11/2013 | Hotta | H02K 11/33 |
| | | | | 361/699 |
| 2015/0251531 | A1* | 9/2015 | Hotta | B60L 50/16 |
| | | | | 903/902 |
| 2016/0072361 | A1* | 3/2016 | Kuramochi | B60L 50/16 |
| | | | | 180/65.21 |
| 2016/0185232 | A1* | 6/2016 | Suzuki | B60L 50/16 |
| | | | | 903/945 |
| 2016/0374235 | A1* | 12/2016 | Sakamoto | H05K 7/20927 |
| 2019/0297751 | A1 | 9/2019 | Okuhata | |
| 2020/0156454 | A1* | 5/2020 | Yaguchi | B60K 6/405 |
| 2020/0161993 | A1* | 5/2020 | Kishimoto | H05K 7/20 |
| 2020/0328652 | A1* | 10/2020 | Miki | F16H 57/0412 |
| 2021/0086635 | A1* | 3/2021 | Ueda | H05K 7/20927 |
| 2021/0316602 | A1* | 10/2021 | Suzuki | H02K 5/04 |
| 2022/0006350 | A1* | 1/2022 | Kang | H02K 9/223 |
| 2022/0111740 | A1* | 4/2022 | Inoue | F16H 48/08 |
| 2022/0158523 | A1* | 5/2022 | Ishikawa | F16H 57/0476 |
| 2022/0158528 | A1* | 5/2022 | Ishikawa | H02K 11/33 |
| 2022/0173641 | A1* | 6/2022 | Fujimoto | H02K 5/203 |
| 2022/0186823 | A1* | 6/2022 | Yamashita | B60K 17/16 |
| 2022/0224200 | A1* | 7/2022 | Honjo | H02K 5/225 |
| 2022/0234456 | A1* | 7/2022 | Sato | H02K 7/006 |
| 2022/0274484 | A1* | 9/2022 | Jinnai | B60K 17/12 |
| 2023/0010604 | A1* | 1/2023 | Ishikawa | H02K 5/203 |
| 2023/0155448 | A1* | 5/2023 | Ogasawara | H02K 11/33 |
| | | | | 310/51 |
| 2023/0302892 | A1* | 9/2023 | Dengler | F16H 57/0446 |
| 2023/0382243 | A1* | 11/2023 | Yuki | B60L 50/51 |
| 2023/0406082 | A1* | 12/2023 | Inoue | H02K 7/116 |
| 2024/0405634 | A1* | 12/2024 | Suzuki | B60L 50/60 |
| 2025/0023427 | A1* | 1/2025 | Kwon | B60L 15/02 |

FOREIGN PATENT DOCUMENTS

| | | | |
|---|---|---|---|
| JP | 2020-88939 A | 6/2020 | |
| JP | 2020162225 A * | 10/2020 | ............. H02M 7/48 |
| JP | 2021151111 A * | 9/2021 | ............. H02K 11/33 |
| JP | 2022161294 A * | 10/2022 | ............. H02K 11/33 |

* cited by examiner

MECHATRONIC INTEGRATED UNIT

CROSS-REFERENCE TO RELATED APPLICATION

This application claims priority to Japanese Patent Application No. 2022-024300 filed on Feb. 18, 2022, incorporated herein by reference in its entirety.

BACKGROUND

1. Technical Field

Technology disclosed in the present specification relates to a mechatronic integrated unit for a vehicle.

2. Description of Related Art

Japanese Unexamined Patent Application Publication No. 2019-170068 (JP 2019-170068 A) describes a mechatronic integrated unit for a vehicle. This mechatronic integrated unit includes a housing that has a first chamber and a second chamber located above the first chamber, a mechanical unit that has a first motor disposed in the first chamber, and an electric circuit unit that is disposed in the second chamber and that is electrically connected to the first motor.

SUMMARY

In the above-described mechatronic integrated unit, the mechanical unit is accommodated in the first chamber of the housing, and the electric circuit unit is accommodated in the second chamber, in order to reduce the size of the mechatronic integrated unit. On the other hand, depending on the vehicle in which the mechatronic integrated unit is installed, a mechanical unit having a first motor and a second motor may be employed instead of the mechanical unit having the first motor. When the second motor is disposed so that at least part thereof is located above the first motor, for example, up-down direction dimensions of the first chamber required to accommodate the two motors (and a gear mechanism) increase. In this case, simply disposing the second chamber for accommodating the electric circuit unit above the first chamber for accommodating the mechanical unit will increase the up-down direction dimensions of the mechatronic integrated unit.

The present specification provides technology for avoiding or suppressing an increase in the up-down direction dimensions of a mechatronic integrated unit when a mechanical unit including two motors is employed.

A mechatronic integrated unit according to a first aspect of the present disclosure includes a housing including a first chamber and a second chamber that is located above the first chamber in an up-down direction of a vehicle, a first motor that is disposed in the first chamber, a second motor that is disposed along a front-rear direction of the vehicle in the first chamber along with the first motor, at least part of the second motor being located above the first motor in the up-down direction of the vehicle, at least one gear mechanism that is disposed in the first chamber and is connected to at least one of the first motor or the second motor, and an electric circuit unit that is disposed in the second chamber and is electrically connected to at least one of the first motor or the second motor. A partition wall between the first chamber and the second chamber of the housing includes a bulging portion that bulges toward the second chamber from a portion of the partition wall other than the bulging portion, the bulging portion being located above the second motor in the up-down direction of the vehicle. At least part of the electric circuit unit faces the bulging portion in the front-rear direction of the vehicle or in a right-left direction of the vehicle.

In the mechatronic integrated unit described above, the second motor is disposed so that at least part thereof is located above the first motor in the first chamber of the housing. Accordingly, the partition wall between the first chamber and the second chamber of the housing includes the bulging portion that bulges toward the second chamber from a portion of the partition wall other than the bulging portion, the bulging portion being located above the second motor, in accordance with the layout of the motors. At least part of the electric circuit unit may be disposed facing the bulging portion of the partition wall (and the second motor disposed in the first chamber) in the front-rear direction of the vehicle, or in the right-left direction of the vehicle. According to such a configuration, at least part of the electric circuit unit can be disposed in excess space that can be created in the second chamber in accordance with the layout of the first motor and the second motor in the first chamber. As a result, even when the up-down direction dimensions of the first chamber increase due to the mechanical unit including two motors, the dimensions of the mechatronic integrated unit in the up-down direction of the vehicle can be reduced by an amount corresponding to dimensions with respect to the electric circuit unit being built into excess space of the first motor and the second motor.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
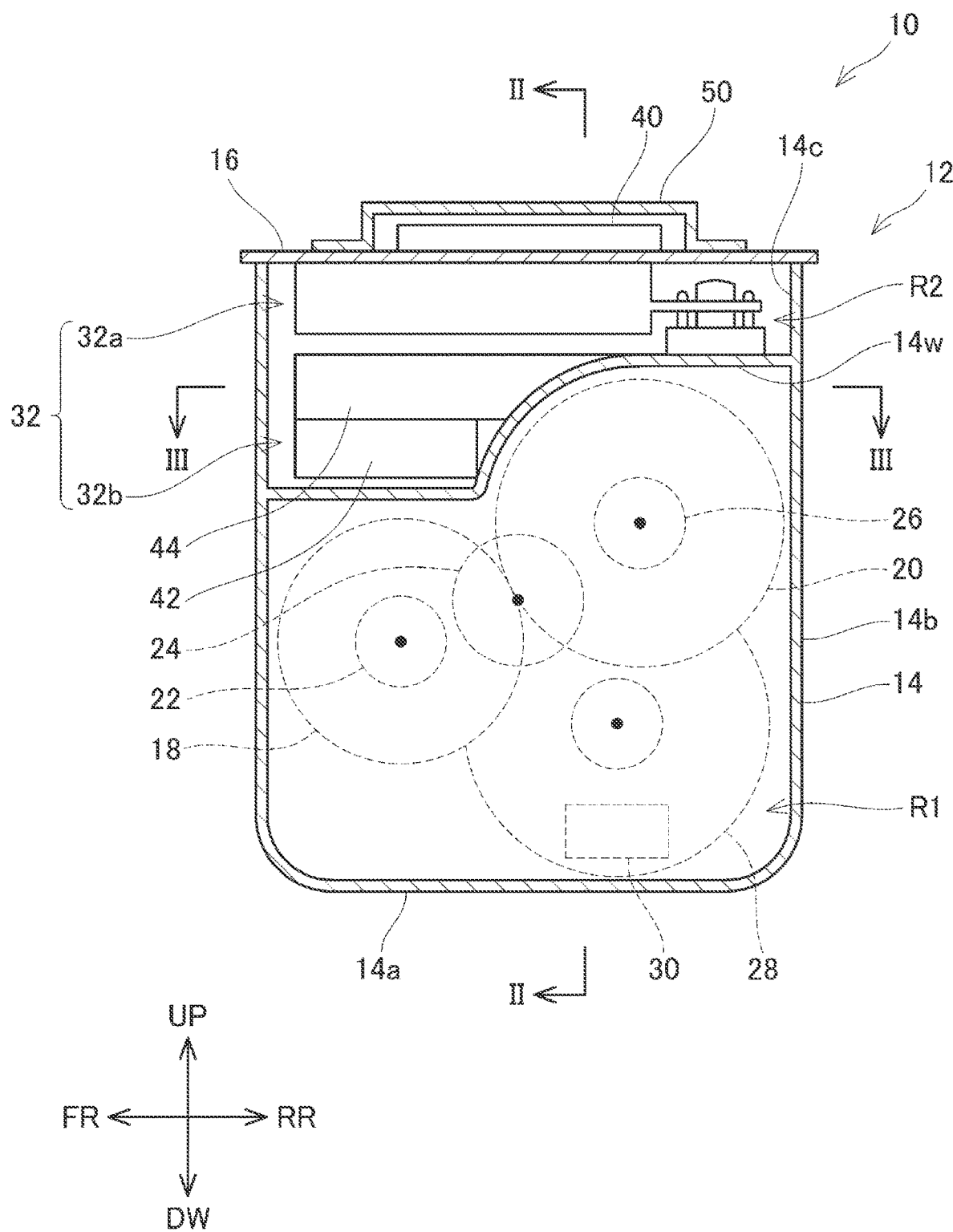
FIG. 1 is a diagram schematically illustrating a configuration of a mechatronic integrated unit 10.

In a mechatronic integrated unit according to a first aspect of the present disclosure, an electric circuit unit may include a first electric circuit unit, and a second electric circuit unit that is located below the first electric circuit unit in an up-down direction of the vehicle. Both the first electric circuit unit and the second electric circuit unit may be located immediately above a first motor in the up-down direction of the vehicle. The first electric circuit unit may be located immediately above a second motor in the up-down direction of the vehicle, and the second electric circuit unit may not be located immediately above the second motor. According to such a configuration, at least part of the electric circuit unit can be disposed in excess space that can be created in accordance with a layout of the first motor and the second motor. Accordingly, the dimensions of the mechatronic integrated unit in the up-down direction of the vehicle can be reduced by an amount corresponding to dimensions with respect to the part of the electric circuit unit being disposed in the excess space that can be created in accordance with a layout of the first motor and the second motor.

In the mechatronic integrated unit according to the first aspect of the present disclosure, a housing may include a housing body with an opening at a top portion and a cover plate attached to the opening. The first electric circuit unit may be fixed to the cover plate. The second electric circuit unit may be fixed to the housing body. According to such a configuration, a part supporting the first electric circuit unit can also serve as the cover plate of the housing. This can simplify the configuration of the mechatronic integrated unit, and due to the electric circuit unit being attached to the cover plate of the housing during assembly work of the mechatronic integrated unit, the high rigidity of the housing enables the first electric circuit unit to be firmly held.

In the mechatronic integrated unit according to the first aspect of the present disclosure, the second electric circuit unit may include a step-down converter that is configured to step down direct current electric power from an electric power supply of the vehicle and configured to supply the direct current electric power to an auxiliary battery of the vehicle. According to such a configuration, the step-down converter can be disposed in the excess space of the mechatronic integrated unit, thus saving vehicle cabin space.

In the mechatronic integrated unit according to the first aspect of the present disclosure, the second electric circuit unit may further include a reactor. The reactor and at least part of the first electric circuit unit may be included in an electric power control circuit that is configured to control electric power supplied to at least one of the first motor or the second motor. According to such a configuration, the electric power control circuit and the step-down converter can be disposed in close proximity to each other, and electric power wiring can be simplified.

In the mechatronic integrated unit according to the first aspect of the present disclosure, the electric power control circuit may include a boost converter that is configured to boost the direct current electric power from the electric power supply of the vehicle. The reactor may be included in the boost converter. The reactor may be separated from a converter circuit of the boost converter. Accordingly, electromagnetic noise that can occur between the reactor and the converter circuit can be reduced.

In the mechatronic integrated unit according to the first aspect of the present disclosure, the electric power control circuit may further include an inverter device configured to convert direct current electric power from the boost converter into alternating current electric power. The inverter device may be provided in the first electric circuit unit. According to such a configuration, the direct current electric power from the electric power supply of the vehicle may be boosted by the boost converter, converted into alternating current electric power by the inverter device, and thereafter may be supplied to at least one of the first motor and the second motor.

In the mechatronic integrated unit according to the first aspect of the present disclosure, the inverter device may include a first inverter and a second inverter, the first inverter may be electrically connected to the first motor, and the second inverter may be electrically connected to the second motor.

In the mechatronic integrated unit according to the first aspect of the present disclosure, the reactor may be located below the step-down converter in the up-down direction of the vehicle in the second electric circuit unit. According to such a configuration, the relatively heavy reactor may be located downward from the relatively light step-down converter, and thus the center of gravity of the second electric circuit unit can be lowered. This enables avoiding or suppressing vibrations from occurring in the second electric circuit unit due to vibrations generated by an engine, vibrations generated by two motors and a gear mechanism in a first chamber, and so forth.

In the mechatronic integrated unit according to the first aspect of the present disclosure, the first chamber may be configured such that lubricating oil circulates. According to such a configuration, the lubricating oil can cool the first motor and the second motor disposed in the first chamber.

A mechatronic integrated unit 10 according to an embodiment will be described with reference to the drawings. The mechatronic integrated unit 10 according to the present embodiment is installed in a vehicle such as a two-motor hybrid electric vehicle, for example. However, the vehicle is not necessarily limited to a hybrid electric vehicle, and may be a vehicle having a traction motor such as a battery electric vehicle, a fuel cell electric vehicle, or the like. Part or all of the technology described in the present embodiment can similarly be used for vehicles that travel along tracks. The vehicle is not limited to a vehicle that is driven and operated by a user, and may be a vehicle that is remotely operated by an external device, or an autonomously-travelling vehicle.

Now, the directions regarding the mechatronic integrated unit 10 in the drawings correspond to directions of installation thereof in the vehicle, i.e., directions regarding the vehicle. Accordingly, a direction FR indicates forward in a front-rear direction of the vehicle, and a direction RR indicates rearward in the front-rear direction of the vehicle. Also, a direction LH indicates leftward in a right-left direction of the vehicle, and a direction RH indicates rightward in the right-left direction of the vehicle. Further, a direction UP indicates upward in the up-down direction of the vehicle, and a direction DW indicates downward in the up-down direction of the vehicle.

Figure 2:
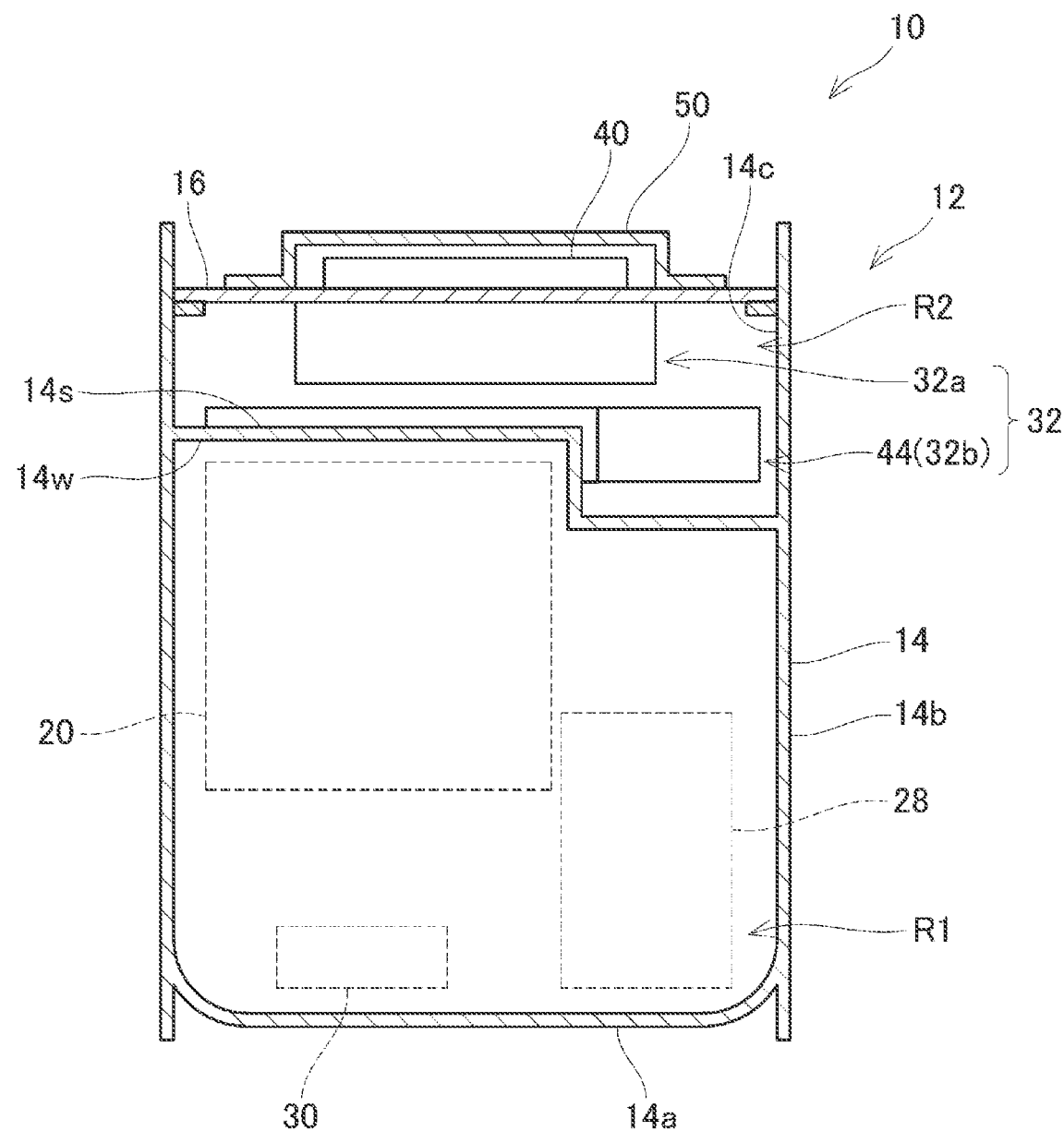
FIG. 2 is a sectional view taken along line II-II in FIG. 1.

As illustrated in FIGS. 1 and 2, the mechatronic integrated unit 10 includes a housing 12. The housing 12 is an enclosure member. The housing 12 includes a housing body 14 and a cover plate 16. The housing body 14 has a bottom wall 14a and four side walls 14b extending upward from outer peripheral edges of the bottom wall 14a. The housing body 14 has an opening 14c at a top portion thereof. The opening 14c of the housing body 14 is defined by the four side walls 14b. The cover plate 16 is attached to the opening 14c. The cover plate 16 closes the opening 14c of the housing body 14. The housing body 14 is made of a conductive material such as aluminum, for example. The cover plate 16 is a plate-like member, and is made of a conductive material such as aluminum, for example.

The housing body 14 further has a partition wall 14w. The partition wall 14w is provided inside the housing 12. The partition wall 14w sections an interior of the housing 12 into a first chamber R1 and a second chamber R2. The second chamber R2 is located above the first chamber R1, with the partition wall 14w interposed therebetween. The partition wall 14w between the first chamber R1 and the second chamber R2 of the housing 12 has a bulging portion 14s that bulges toward the second chamber R2 side from other portions thereof, at a portion located above a second motor 20.

As illustrated in FIGS. 1 and 2, the mechatronic integrated unit 10 includes a plurality of motors 18 and 20, and a plurality of gear mechanisms 22, 24, 26, and 28. The motors 18 and 20 include a first motor 18 and the second motor 20. The first motor 18 and the second motor 20 are disposed in the first chamber R1. The second motor 20 is disposed along the front-rear direction of the vehicle along with the first motor 18 in the first chamber R1, and at least a portion thereof is located above the first motor 18. The gear mechanisms 22, 24, 26, and 28 are disposed in the first chamber R1. The gear mechanisms 22, 24, 26, and 28 include a planetary gear mechanism 22, a reduction gear mechanism 24, a motor output gear mechanism 26, and a differential gear mechanism 28, although not limited thereto in particular. The motor output gear mechanism 26 is connected to the second motor 20 via an axle, for example. Accordingly, the vehicle can drive wheels by motive power from the second motor 20, via the motor output gear mechanism 26. Note that the number of the motors 18 and 20 is not necessarily limited to two, and may be three or more. The gear mechanisms 22, 24, 26, and 28 do not necessarily have to be multiple in number, and at least one is sufficient.

As illustrated in FIGS. 1 and 2, the mechatronic integrated unit 10 further includes an oil pump 30. The oil pump 30 is disposed in the first chamber R1. The oil pump 30 is connected to an engine (omitted from illustration) of the vehicle, and is driven by motive power from the engine, although not limited thereto in particular. Accordingly, the oil pump 30 can circulate lubricating oil within the first chamber R1, and can cool the first motor 18 and the second motor 20 disposed in the first chamber R1. Note that as another embodiment, the oil pump 30 may be driven by output torque from the motors 18 and 20 instead of the motive power from the vehicle engine.

As illustrated in FIGS. 1 and 2, the mechatronic integrated unit 10 further includes an electric circuit unit 32. The electric circuit unit 32 is disposed in the second chamber R2. The electric circuit unit 32 is electrically connected to at least one of the first motor 18 and the second motor 20. The electric circuit unit 32 has a first electric circuit unit 32a and a second electric circuit unit 32b. The second electric circuit unit 32b is located downward from the first electric circuit unit 32a. As an example, the first electric circuit unit 32a is fixed to the cover plate 16 of the housing 12, and the second electric circuit unit 32b is fixed to the housing body 14. The mechatronic integrated unit 10 may further include a cooler for recovering heat from the electric circuit unit 32, although not limited thereto in particular.

Figure 3:
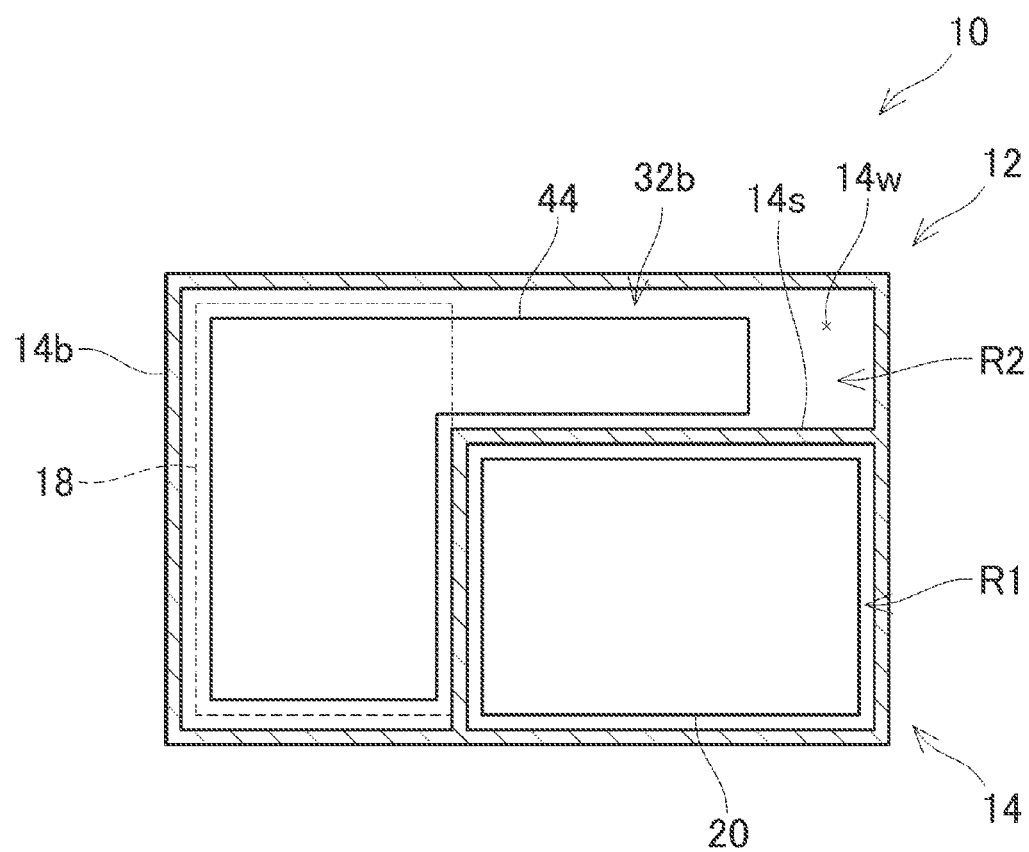
FIG. 3 is an end view taken along line III-III in FIG. 1, in which a step-down converter 44 of a second electric circuit unit 32b is illustrated, in order to describe a positional relation between the second electric circuit unit 32b, and a first motor 18 and a second motor 20.
Figure 3:
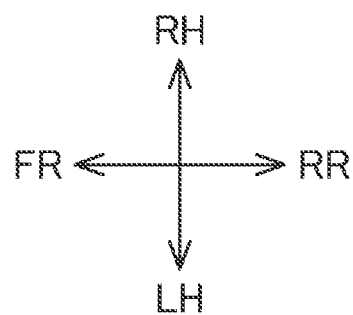

As illustrated in FIG. 3, the second electric circuit unit 32b has a general letter-L shape in plan view. Accordingly, the second electric circuit unit 32b is disposed so as to circumvent the bulging portion 14s, above the partition wall 14w of the housing 12. That is to say, part of the second electric circuit unit 32b is in a positional relation facing the bulging portion 14s (and the second motor 20) in the front-rear direction, and the other part of the second electric circuit unit 32b is in a positional relation facing the bulging portion 14s (and the second motor 20) in the right-left direction. As a result, as illustrated in FIG. 1, both the first electric circuit unit 32a and the second electric circuit unit 32b are located immediately above the first motor 18, while only the first electric circuit unit 32a is located immediately above the second motor 20. That is to say, the second electric circuit unit 32b is not present immediately above the second motor 20.

The specific configurations of the first electric circuit unit 32a and the second electric circuit unit 32b described above are not limited in particular. An example of a specific configuration of the first electric circuit unit 32a and the second electric circuit unit 32b will be described below with reference to FIG. 4.

Figure 4:
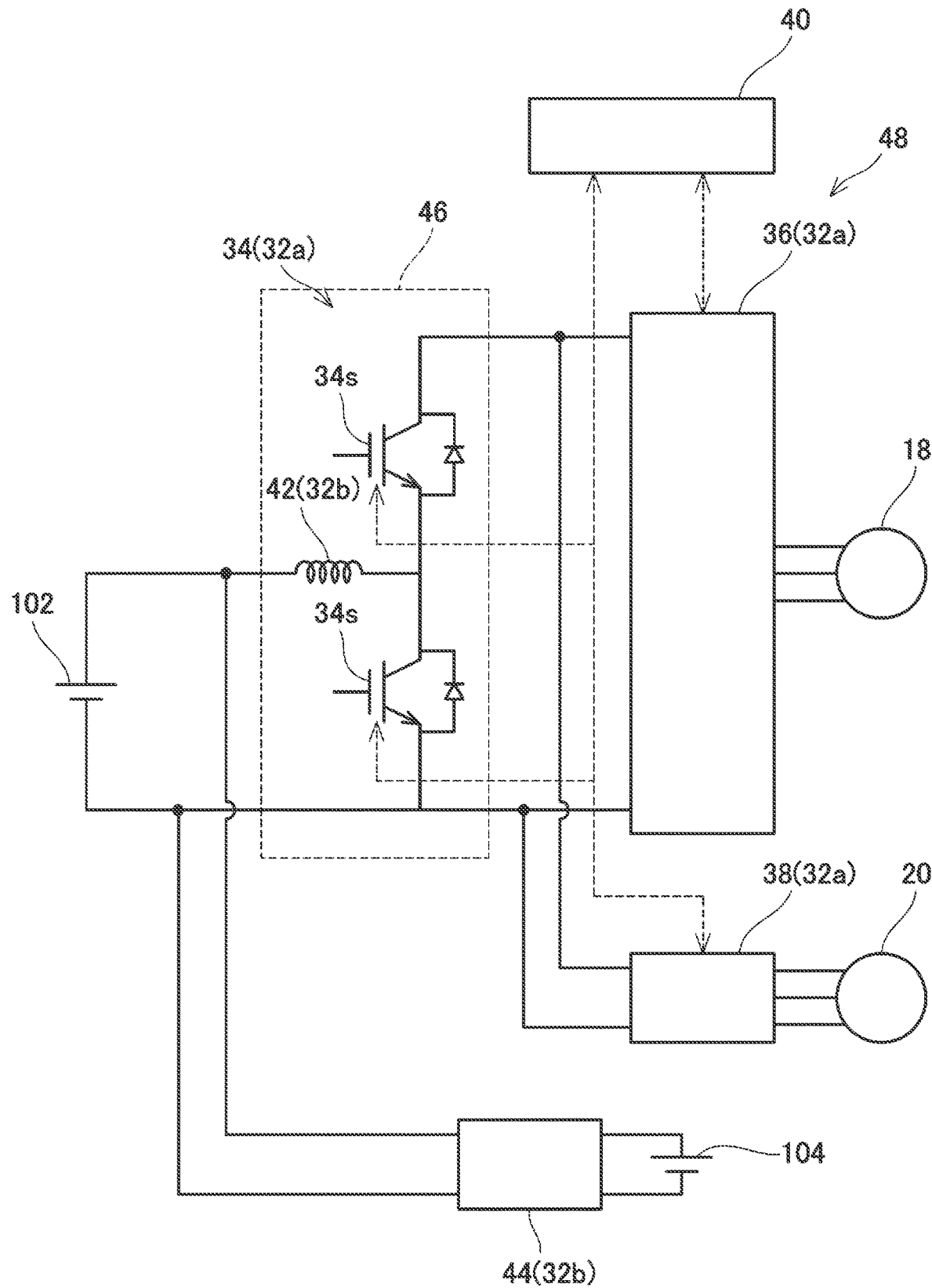
FIG. 4 is a block circuit diagram illustrating an electrical configuration of the mechatronic integrated unit 10, in which an electric power supply 102 and an auxiliary battery 104 of a vehicle are also illustrated.

As illustrated in FIG. 4, the first electric circuit unit 32a includes a direct current (DC)-to-DC converter circuit 34, a first inverter 36, a second inverter 38, and a control board 40. The DC-to-DC converter circuit 34 has two switching devices 34s. The control board 40 has components such as a processor containing a CPU and memory, and controls the switching devices 34s of the DC-to-DC converter circuit 34 and the inverters 36 and 38. The DC-to-DC converter circuit 34, the first inverter 36, and the second inverter 38 are disposed on a lower face of the cover plate 16, and the control board 40 is disposed on an upper face of the cover plate 16, although not limited thereto in particular. A protective cover 50 is provided above the cover plate 16. The protective cover 50 covers the control board 40 located on the upper face of the cover plate 16.

As illustrated in FIG. 4, the second electric circuit unit 32b includes a reactor 42 and a step-down converter 44. The reactor 42 is located below the step-down converter 44 in the second electric circuit unit 32b, although not limited thereto in particular.

As illustrated in FIG. 4, the reactor 42 of the second electric circuit unit 32b and the DC-to-DC converter circuit 34 of the first electric circuit unit 32a make up a boost converter 46. In the DC-to-DC converter circuit 34, an end of one switching device 34s is connected to a positive electrode of the first inverter 36 and a positive electrode of the second inverter 38. The other end of the one switching device 34s is connected to an end of the other switching device 34s and is also connected to a positive electrode of an electric power supply 102 of the vehicle via the reactor 42. The other end of the other switching device 34s is connected to a negative electrode of the electric power supply 102 of the vehicle and also to a negative electrode of the first inverter 36 and a negative electrode of the second inverter 38. The control board 40 can boost the direct current electric power from the electric power supply 102 and supply the boosted electric power to the inverters 36 and 38 by selectively turning on and off the switching devices 34s. As described above, the reactor 42 makes up the boost converter 46 together with the DC-to-DC converter circuit 34 of the first electric circuit unit 32a.

The switching devices 34s of the DC-to-DC converter circuit 34 are reverse conducting insulated gate bipolar transistor (RC-IGBT) devices, although not limited thereto in particular. Note that the switching devices 34s do not necessarily have to be RC-IGBT devices, and may be, for example, metal-oxide-semiconductor field-effect transistor (MOSFET) devices or some other type of switching devices.

As illustrated in FIG. 4, the first inverter 36, the second inverter 38, and the boost converter 46 make up an electric power control circuit 48. The electric power control circuit 48 is electrically connected between the electric power supply 102 of the vehicle and the motors 18 and 20. The boost converter 46 can boost the direct current electric power from the electric power supply 102 and perform supply thereof to each of the first inverter 36 and the second inverter 38. The first inverter 36 can convert the direct current electric power from the boost converter 46 into alternating current electric power and supply the alternating current electric power to the first motor 18. In the same way, the second inverter 38 can convert the direct current electric power from the boost converter 46 into alternating current electric power and supply the alternating current electric power to the second motor 20. As described above, the electric power control circuit 48 can control the electric power supplied from the electric power supply 102 of the vehicle to the motors 18 and 20. Note that the electric power control circuit 48 may further include a smoothing capacitor between the electric power supply 102 and the boost converter 46, and/or between the boost converter 46 and the inverters 36 and 38, although not limited thereto in particular.

The boost converter 46 may further have a function as a step-down converter, although not limited thereto in particular. For example, when the first motor 18 functions as an electric power generator, the alternating current electric power from the first motor 18 may be converted into direct current electric power by the first inverter 36 and stepped down by the boost converter 46, and thereafter supplied to the electric power supply 102 of the vehicle. In the same way, when the second motor 20 functions as an electric power generator, the alternating current electric power from the second motor 20 may be converted into direct current electric power by the second inverter 38 and stepped down by the boost converter 46, and thereafter supplied to the electric power supply 102 of the vehicle.

As illustrated in FIG. 4, the step-down converter 44 is electrically connected between the electric power supply 102 and an auxiliary battery 104 of the vehicle. The step-down converter 44 is capable of stepping down the direct current electric power from the electric power supply 102 and performing supply thereof to the auxiliary battery 104. The auxiliary battery 104 is connected to the various types of control systems and other accessories of the vehicle, and supplies electric power thereto. Rated voltage of the auxiliary battery 104 is 12 volts, although not limited thereto in particular.

In the mechatronic integrated unit 10 described above, the second motor 20 is disposed so that at least part thereof is located above the first motor 18 in the first chamber R1 of the housing 12. Accordingly, the partition wall 14w between the first chamber R1 and the second chamber R2 of the housing 12 has the bulging portion 14s that bulges toward the second chamber R2 side beyond the other portions thereof, at a portion located above the second motor 20, in accordance with the layout of the motors 18 and 20. At least part of the second electric circuit unit 32b is disposed facing the bulging portion 14s of the partition wall 14w (and the second motor 20 disposed in the first chamber R1) in the front-rear direction of the vehicle, or in the right-left direction of the vehicle. According to such a configuration, at least part of the second electric circuit unit 32b can be disposed in excess space that can be created in the second chamber R2 in accordance with the layout of the first motor 18 and the second motor 20 in the first chamber R1. As a result, even when the up-down direction dimensions of the first chamber R1 increase due to the layout of the two motors 18 and 20 in the first chamber R1, the dimensions of the mechatronic integrated unit 10 in the up-down direction of the vehicle can be reduced by an amount corresponding to dimensions with respect to the part of the second electric circuit unit 32b being disposed in the excess space that can be created in accordance with a layout of the first motor 18 and the second motor 20.

While some specific examples are described in detail above, these are only exemplary, and are not intended to limit the scope of the claims. The technology defined in the claims includes various modifications and alterations of the specific examples described above. The technical elements described in the present specification or in the drawings exhibit technical usefulness thereof alone or in combination.

What is claimed is:

1. A mechatronic integrated unit for a vehicle, the mechatronic integrated unit comprising:

a housing including a first chamber and a second chamber that is located above the first chamber in an up-down direction of the vehicle;

a first motor that is disposed in the first chamber;

a second motor that is disposed along a front-rear direction of the vehicle in the first chamber along with the first motor, at least part of the second motor being located above the first motor in the up-down direction of the vehicle;

at least one gear mechanism that is disposed in the first chamber and is connected to at least one of the first motor or the second motor; and an electric circuit unit that is disposed in the second chamber and is electrically connected to at least one of the first motor or the second motor, wherein:

the electric circuit unit includes a first electric circuit unit, and a second electric circuit unit that is located below the first electric circuit unit in the up-down direction of the vehicle, both the first electric circuit unit and the second electric circuit unit are located immediately above the first motor in the up-down direction of the vehicle, the first electric circuit unit is located immediately above the second motor in the up-down direction of the vehicle, and the second electric circuit unit is not located immediately above the second motor, a partition wall between the first chamber and the second chamber of the housing includes a bulging portion that bulges toward the second chamber from a portion of the partition wall other than the bulging portion, the bulging portion being located above the second motor in the up-down direction of the vehicle, and a part of the second electric circuit unit is in a position facing the bulging portion in the front-rear direction of the vehicle, and another part of the second electric circuit unit is in a position facing the bulging portion in a right-left direction of the vehicle.

2. The mechatronic integrated unit according to claim 1, wherein:

the housing includes a housing body with an opening at a top portion and a cover plate attached to the opening;

the first electric circuit unit is fixed to the cover plate; and the second electric circuit unit is fixed to the housing body.

3. The mechatronic integrated unit according to claim 1, wherein the second electric circuit unit includes a step-down converter that is configured to step down direct current electric power from an electric power supply of the vehicle and configured to supply the direct current electric power to an auxiliary battery of the vehicle.

4. The mechatronic integrated unit according to claim 3, wherein:

the second electric circuit unit further includes a reactor; and the reactor and at least part of the first electric circuit unit are included in an electric power control circuit that is configured to control electric power supplied to at least one of the first motor or the second motor.

5. The mechatronic integrated unit according to claim 4, wherein:
the electric power control circuit includes a boost converter that is configured to boost the direct current electric power from the electric power supply of the vehicle; and
the reactor is included in the boost converter.

6. The mechatronic integrated unit according to claim 5, wherein:
the electric power control circuit further includes an inverter device configured to convert the direct current electric power from the boost converter into alternating current electric power; and
the inverter device is provided in the first electric circuit unit.

7. The mechatronic integrated unit according to claim 6, wherein:
the inverter device includes a first inverter and a second inverter; and
the first inverter is electrically connected to the first motor and the second inverter is electrically connected to the second motor.

8. The mechatronic integrated unit according to claim 4, wherein the reactor is located below the step-down converter in the up-down direction of the vehicle in the second electric circuit unit.

9. The mechatronic integrated unit according to claim 4, wherein the part of the second electric unit includes the reactor, and the another part of the second electric unit includes the step-down converter.

10. The mechatronic integrated unit according to claim 9, wherein, in a plan view, the second electric circuit unit forms an L-shape around the bulging portion.

11. The mechatronic integrated unit according to claim 1, wherein the first chamber is configured such that lubricating oil circulates.

* * * * *